(12) United States Patent
Mori et al.

(10) Patent No.: US 7,847,485 B2
(45) Date of Patent: Dec. 7, 2010

(54) AURORA CURTAIN GENERATION DEVICE AND AURORA CURTAIN GENERATION METHOD

(75) Inventors: Kazuhiko Mori, Musashino (JP); Shigeyuki Minami, Izumi (JP); Yuuji Kurose, Musashino (JP); Ayumu Watanabe, Musashino (JP); Yasuhiro Ono, Musashino (JP); Hideyuki Saito, Musashino (JP)

(73) Assignee: Iida Home Max Co., Ltd., Tokyo (JP)

( * ) Notice: Subject to any disclaimer, the term of this patent is extended or adjusted under 35 U.S.C. 154(b) by 411 days.

(21) Appl. No.: 11/988,868

(22) PCT Filed: Jul. 19, 2006

(86) PCT No.: PCT/JP2006/314294

§ 371 (c)(1),
(2), (4) Date: Jan. 16, 2008

(87) PCT Pub. No.: WO2007/010947

PCT Pub. Date: Jan. 25, 2007

(65) Prior Publication Data

US 2009/0114525 A1    May 7, 2009

(30) Foreign Application Priority Data

Jul. 19, 2005    (JP)    ............... 2005-208199

(51) Int. Cl.
*H01J 7/24* (2006.01)
(52) U.S. Cl. .............. 315/111.21; 315/111.41; 315/111.71; 315/111.01
(58) Field of Classification Search ............ 315/111.21, 315/111.41, 111.71, 111.01; 362/565–569, 362/392, 810
See application file for complete search history.

(56) References Cited

U.S. PATENT DOCUMENTS 6,335,595 B1 *  1/2002  Nishikawa et al. ..... 315/111.21

FOREIGN PATENT DOCUMENTS

| JP | 2-282780 | 11/1990 |
|----|----------|---------|
| JP | 4-79198 | 3/1992 |
| JP | 5-54994 | 3/1993 |
| JP | 5-274903 | 10/1993 |
| JP | 6-203610 | 7/1994 |
| JP | 9-44081 | 2/1997 |

(Continued)

OTHER PUBLICATIONS

International Search Report issued Oct. 17, 2006 in International (PCT) Application No. PCT/JP2006/314294.

(Continued)

*Primary Examiner*—Tuyet Thi Vo
(74) *Attorney, Agent, or Firm*—Wenderoth, Lind & Ponack, L.L.P.

(57) ABSTRACT

A method and a device for artificially generating and showing an aurora and for generating and changing a true-to-life curtain-shaped discharge light emission by using a simple device. In a pressure-reduced chamber, two electrodes are arranged in the X direction and a third electrode is arranged in the Z direction in such a manner that the two electrodes oppose the third electrode and they are apart from each other. A coil generates a magnetic line of force in the Z direction.

7 Claims, 4 Drawing Sheets

FOREIGN PATENT DOCUMENTS

| | | |
|---|---|---|
| JP | 10-63180 | 3/1998 |
| JP | 10-293549 | 11/1998 |
| JP | 11-174949 | 7/1999 |
| JP | 11-282340 | 10/1999 |
| JP | 2001-175162 | 6/2001 |
| JP | 2001-175163 | 6/2001 |

OTHER PUBLICATIONS

International Preliminary Report on Patentability issued on Apr. 24, 2008 in International (PCT) Application No. PCT/JP2006/314294.

* cited by examiner

AURORA CURTAIN GENERATION DEVICE AND AURORA CURTAIN GENERATION METHOD

TECHNICAL FIELD

The present invention relates to a technique to generate aurora by artificially causing electric discharge in the air, and more particularly to a device and method for generating aurora in the shape of a curtain larger than the size of an adult human.

BACKGROUND ART

Techniques to artificially generate aurora have been studied. Such studies are classified broadly into:

(i) academic studies exploring the mechanism of aurora generation by modeling the relationship between the sun emitting charged particles and the magnetic earth (see Japanese Patent Laid-Open No. Hei9-44081: Patent Document 1, for example); and (ii) studies of techniques to generate curtains of aurora for the purpose of exhibition, e.g. for staging a spectacular macrocosmic show.

The aurora generation techniques for the purpose of exhibition in the above item (ii) utilizes numerous light leaking optical fibers to form a curtain to be illuminated with artificially light (see Japanese Patent Laid-Open No. Hei5-274903: Patent Document 2) or to be illuminated with laser light beams (see Japanese Patent Laid-Open No. Hei6-203610: Patent Document 3).

However, such imitated exhibitions of aurora lacks reality and impact because the do not utilize electric discharge phenomenon. In order to present an exhibition of artificial aurora with reality and impact, it is effective to utilize electric discharge phenomenon. It is experimentally known that light emission in irregular forms is observed between two electrodes set up in a vacuumed chamber by causing electric discharge between the two electrodes. The problem in the artificial aurora generation device of the art is that how it can generate a light emission in a curtain-like shape by electric discharge.

Disclosed in Japanese Patent Laid-Open No. Hei10-63180 (Patent Document 4) is an aurora generation device in which light emission in a planar form is generated by electric discharge. This invention comprises, as the requisite elements, a shield plate regulating excessive light emission and a center glass introducing electric discharge. It is reported that this invention enables to generate aurora in a belt-like shape.

As an improved invention of the above invention, an aurora generation device further comprising an earth electrode formed to imitate a terrestrial object is disclosed (Japanese Patent Laid-Open No. 2001-175163: Patent Document 5).

[Patent Document 1] Japanese Patent Laid-Open No. Hei09-44081.

[Patent Document 2] Japanese Patent Laid-Open No. Hei05-274903.

[Patent Document 3] Japanese Patent Laid-Open No. Hei06-203610.

[Patent Document 4] Japanese Patent Laid-Open No. Hei10-63180.

[Patent Document 5] Japanese Patent Laid-Open No. 2001-175163.

DISCLOSURE OF THE INVENTION

Problems to be Solved by the Invention

The aurora generation device disclosed in Japanese Patent Laid-Open No. Hei10-63180 is valuable in that it contributed to the progress of artificial aurora generating technique by enabling to generate electronic discharge (light emission) in a planar form.

However, further improvement is desired in order to exhibit real aurora miniaturized. In other words, the aurora generation device of the above invention can only generate aurora in a planar form because the invention necessarily comprises a shield plate regulating excessive light emission and a center glass introducing electric discharge.

The real aurora has pleats constantly waving, flickering and changing in color.

OBJECT OF THE INVENTION

The first object of the present invention is to provide a device and a method for artificially generating aurora (vacuum electric discharge) in a curtain-like shape having waved pleats without necessitating to place a shield plate and a center glass in the vicinity of the electrodes.

The second object of the present invention is to provide, as an improved invention of the above invention, a device and a method for generating a further realistic aurora in a curtain-like shape having moves and colors.

Means for Solving the Problems

The basic principle of the present invention which solves the above problem is below described by illustrating an embodiment of the present invention with reference to FIG. 1. It is already known that an irregular-shape light emission 5 is generated by applying a high voltage between two electrodes 2 and 3 disposed to face each other in the vertical direction in a vacuumed chamber 1. In the present invention, shaping coils 6 are placed so as to produce a magnetic field m in a direction parallel to the direction of electric discharge, as shown in FIG. 1. Thus, light emission in a plate-like form is generated along the plane including the linear electrode 2.

The light emission can be bent or waved because it is not restricted by a shield plate or a center glass employed in the prior art.

On the basis of the above-mentioned basic principle, a first aspect of the present invention provides an aurora generation device for generating aurora by causing electric discharge in a vacuumed chamber comprising:

in orthogonal coordinates consisting of X, Y and Z axes;

two electrodes each connected to a power source and disposed to face each other in the direction of Z axis, at least one of said electrodes disposed in an X-Y plane and extending linearly in the direction of X axis, at least one of said electrodes disposed in an X-Y plane and extending linearly in the direction of X axis, said one of said electrodes made of flexible linear member capable of being curved;

electric driving means to move said linear member in the direction of Y axis; and coils producing a magnetic flux between said two electrodes in the direction of Z axis, wherein said electric driving means moves said linear member in the direction of Y axis to form a curved shape, and wherein electric discharge is caused between said two electrodes and said coils produce magnetic flux between said two electrodes, thereby generating light emission in the form of a curved plane bent toward the direction of Y axis.

A second aspect of the present invention provides an aurora generation device for generating aurora by causing electric discharge in a vacuumed chamber comprising:

in orthogonal coordinates consisting of X, Y and Z axes;

an electrode disposed at an end in the direction of Z axis;

an assembled electrode consisting of electrodes arranged in a matrix on an X-Y plane disposed to face said electrode in the direction of Z axis; and coils producing magnetic flux between said electrode and said assembled electrode in the direction of Z axis, wherein electric discharge is caused between said electrode and selected electrodes of said assembled electrode, said selected electrodes collectively forming a curved shape, and wherein said coils produce magnetic flux between said electrode and said selected electrodes, thereby generating light emission in the form of a curved plane bent toward the direction of Y axis.

A third aspect of the present invention provides the aurora generation device as set forth in the first or second aspects further comprising means to regulate current of said coils producing magnetic flux in the direction of Z axis.

A fourth aspect of the present invention provides the aurora generation device as set forth in any one of the first or second aspects further comprising means to regulate electric discharge caused between said two electrodes/between said electrode and said selected electrodes, said means causing electric discharge by applying pulsed voltage having such a cycle that the light emission appears flickering to an observer.

A fifth aspect of the present invention provides the aurora generation device as set forth in the first or second aspects further comprising vacuuming means to decrease the pressure in said vacuumed chamber by vacuuming and injection means to inject gases into said vacuumed chamber.

A sixth aspect of the present invention provides an aurora generation method for generating aurora by causing electric discharge in a vacuumed chamber using a device comprising:

in orthogonal coordinates consisting of X, Y and Z axes;

two electrodes each connected to a power source and disposed to face each other in the direction of Z axis, at least one of said electrodes disposed in an X-Y plane and extending linearly in the direction of X axis, said one of said electrodes made of flexible linear member capable of being curved;

electric driving means to move said linear member in the direction of Y axis;

coils producing magnetic flux between said two electrodes in the direction of Z axis; and deflecting coils producing magnetic flux substantially in the direction of Y axis, whereby said electric driving means moves said linear member in the direction of Y axis to form a curved shape, electric discharge is caused between said two electrodes and said coils produce magnetic flux between said two electrodes, and light emission is generated in the form of a curved plane bent toward the direction of Y axis.

A seventh aspect of the present invention provides an aurora generation method for generating aurora by causing electric discharge in a vacuumed chamber using a device comprising:

in orthogonal coordinates consisting of X, Y and Z axes;

an electrode disposed at an end in the direction of Z axis;

an assembled electrode consisting of electrodes arranged in a matrix on an X-Y plane disposed to face said electrode in the direction of Z axis; and coils producing magnetic flux between said electrode and said assembled electrode in the direction of Z axis, whereby
electric discharge is caused between said electrode and selected electrodes of said assembled electrode, said selected electrodes collectively forming a curved shape, said coils produce magnetic flux between said electrode and said selected electrodes, and light emission is generated in the form of a curved plane bent toward the direction of Y axis.

An eighth aspect of the present invention provides the aurora generation device as set forth in any one of the first to seventh aspects further comprising a vacuuming means (Vac) disposed in said vacuumed chamber (1) and means to introduce gas (Gc) into said vacuumed chamber (1) (see FIG. 1).

A ninth aspect of the present invention provides an aurora generation method for generating aurora by causing electric discharge in a vacuumed chamber (1) comprising the steps of:

in orthogonal coordinates consisting of horizontal X and Y axes and a vertical Z axis;

disposing two electrodes each connected to a power source (4) to face each other in the direction of Z axis, at least one of said electrodes (2) extending linearly in the direction of X axis; and allowing said two electrodes to produce a magnetic flux (m) therebetween, thereby generating light emission to appear as a curtain-like aurora along a plane including said linearly extending electrodes (2) (see FIG. 1).

BEST MODE FOR CARRYING OUT THE INVENTION

Figure 1:
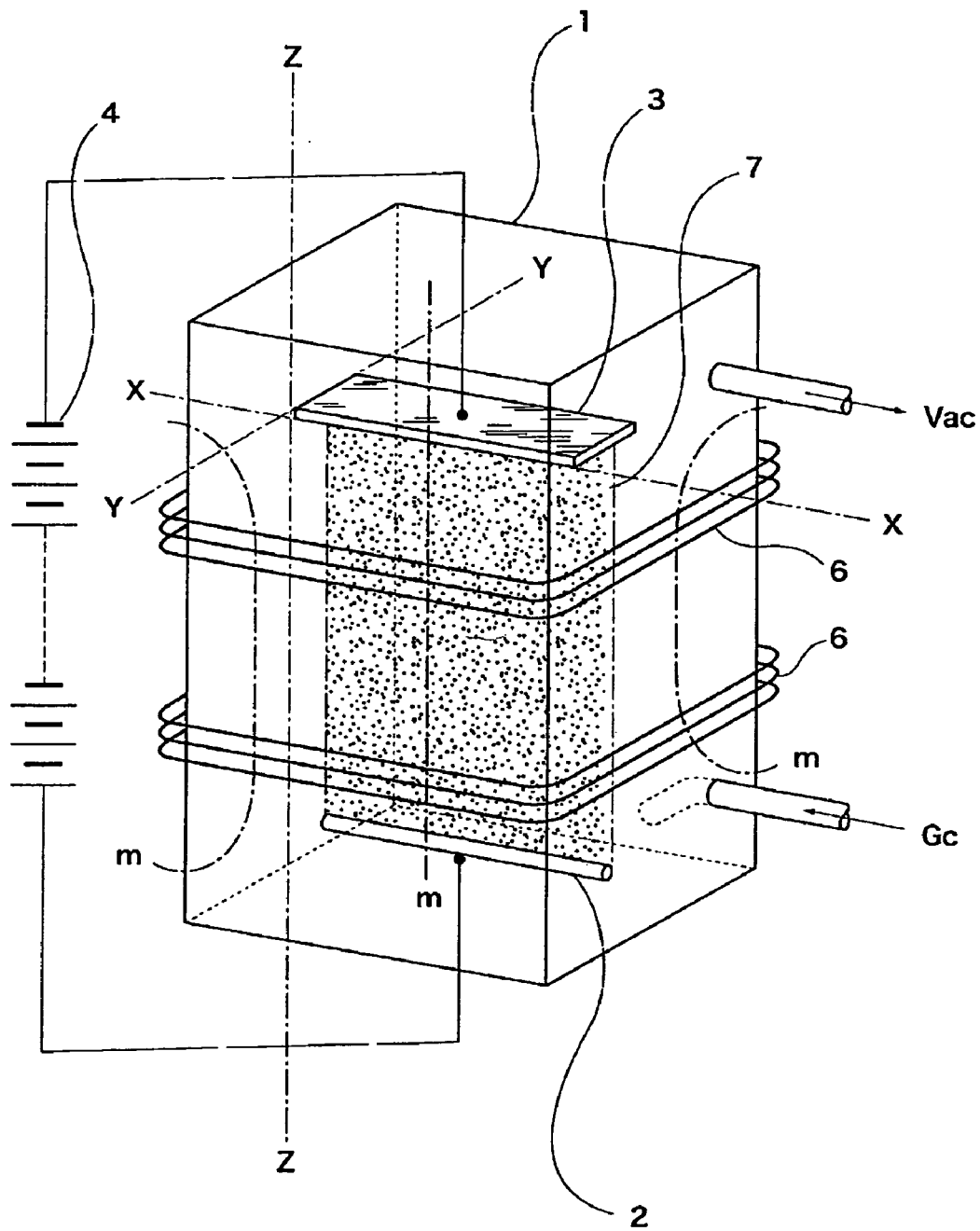
FIG. 1 A typical perspective view of the first embodiment of the present invention.
Figure 2:
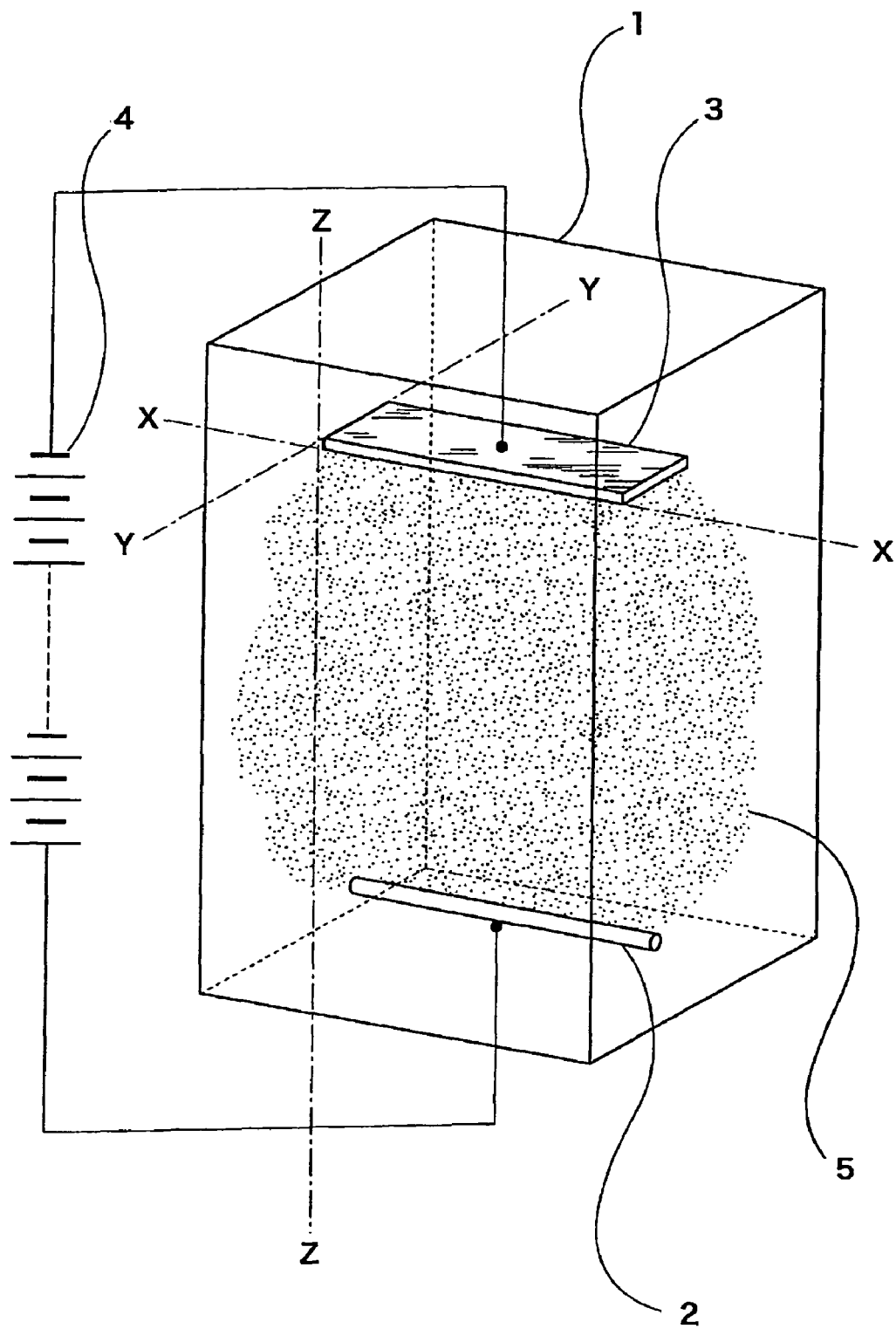
FIG. 2 A typical perspective view of the prior art vacuum electric discharge device shown as a comparative example.

FIG. 1 is a typical perspective view of the first embodiment of the present invention. FIG. 2 is a typical perspective view of the prior art vacuum electric discharge device shown as a comparative example.

In these drawing sheets are assumed a X-Y horizontal orthogonal coordinates and a Z vertical coordinate. In the embodiments of the present invention, however, orthogonal coordinates of X, Y and Z can be arbitrarily assumed and they do not have to be vertical/horizontal relative to the earth.

As shown in FIG. 2, it is experimentally known that light emission 5 in an irregular form is generated by applying high voltage of several volts by a power source 4 to electrodes 2 and 3, which are disposed to face each other at a distance in a vacuumed chamber 1.

The instant embodiment (shown in FIG. 1) is different from the prior art (shown in FIG. 2) in that the instant embodiment employs shaping coils 6. The shaping coils 6 produce magnetic flux m substantially in the direction of Z axis between the electrodes 2 and 3. In general, magnetic flux produced by energized coils forms a closed circle. Accordingly, "magnetic flux in the direction of Z axis" herein mentioned means magnetic flux substantially in the direction of Z axis.

In the present invention, "linear electrodes" are not made in the form of a geometric line but have a certain volume. Because at least one of the two electrodes is linear electrode (s) capable of producing magnetic flux m, electric discharge is caused along a plane including one of the linear electrode(s) and crossing the other electrode. This enables to generate light emission along the above plane. Thus, an artificial aurora (light emission by electric discharge) 7 in a curtain-like form is generated.

It is possible to reduce the thickness of the curtain-like light emission 7 by increasing current supplied to the shaping coils 6. It is also possible to increase the thickness of the curtain-like light emission 7 by lowering current supplied to the shaping coils 6. In view of the fact that light emission in a irregular form 5 such as shown in FIG. 2 is generated by reducing current supplied to the shaping coils 6 to zero, it is understandable that the thickness of the curtain-like light emission 7 is varied by changing current supplied to the shaping coils 6.

It is possible to generate a curtain-like light emission 7 with a desirable thickness by regulating current supplied to the shaping coils 6. Furthermore, it will produce an effective exhibition to change the thickness of the curtain-like light emission 7 by controlling current supplied to the shaping coils 6 in accordance with music, for example.

The vacuumed chamber 1 is vacuumed at a high degree (1 Torr or less) by vacuuming means (Vac). It is possible to give colors to the curtain-like light emission by introducing colored gas (Gc) so as not to substantially change the degree of vacuum in the vacuumed chamber 1 (see FIG. 1). For example, nitrogen gas gives blue color, neon gas gives pink color and helium gas gives blue green color.

Oxygen gas gives red color when the charged particles have a high collision energy, and gives green color when the charged particles have a low collision energy. It is possible to get much better exhibition effects by skillfully introducing many kinds of coloring gas to vary the colors of the aurora curtain.

Although the power source 4 is typically shown as electric batteries, the power supplied does not have to be direct current. By supplying pulsated current produced by superimposing alternate current on direct current of several kilovolts necessary to vacuum cause electric discharge, the curtain-like light emission 7 flickers to give the observer realistic sensation. In this case, the cycle of alternate current is adjusted to effect desired flickering the curtain-like light emission 7.

Although only one coloring gas introducing member is shown in FIG. 1, two or more coloring gas introducing member may be employed.

Figure 3:
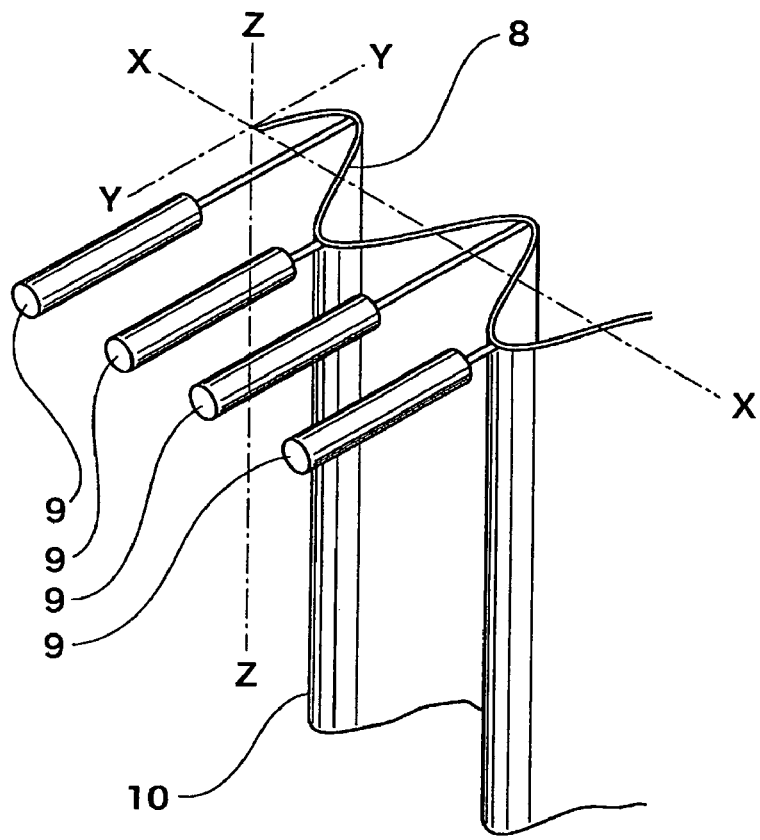
FIG. 3 A perspective view of the main part of an embodiment different from the embodiment of FIG. 1.
Figure 4:
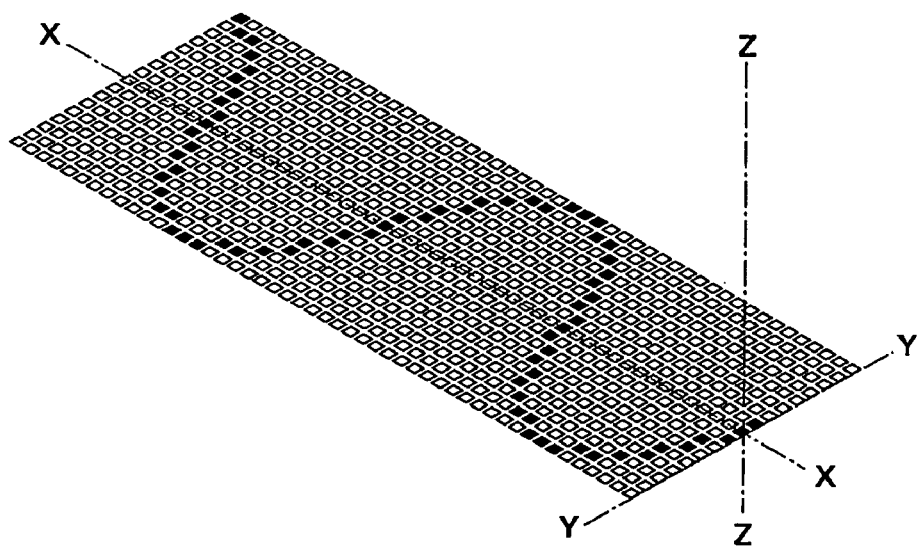
FIG. 4 A perspective view of the main part of a further different embodiment.
Figure 5:
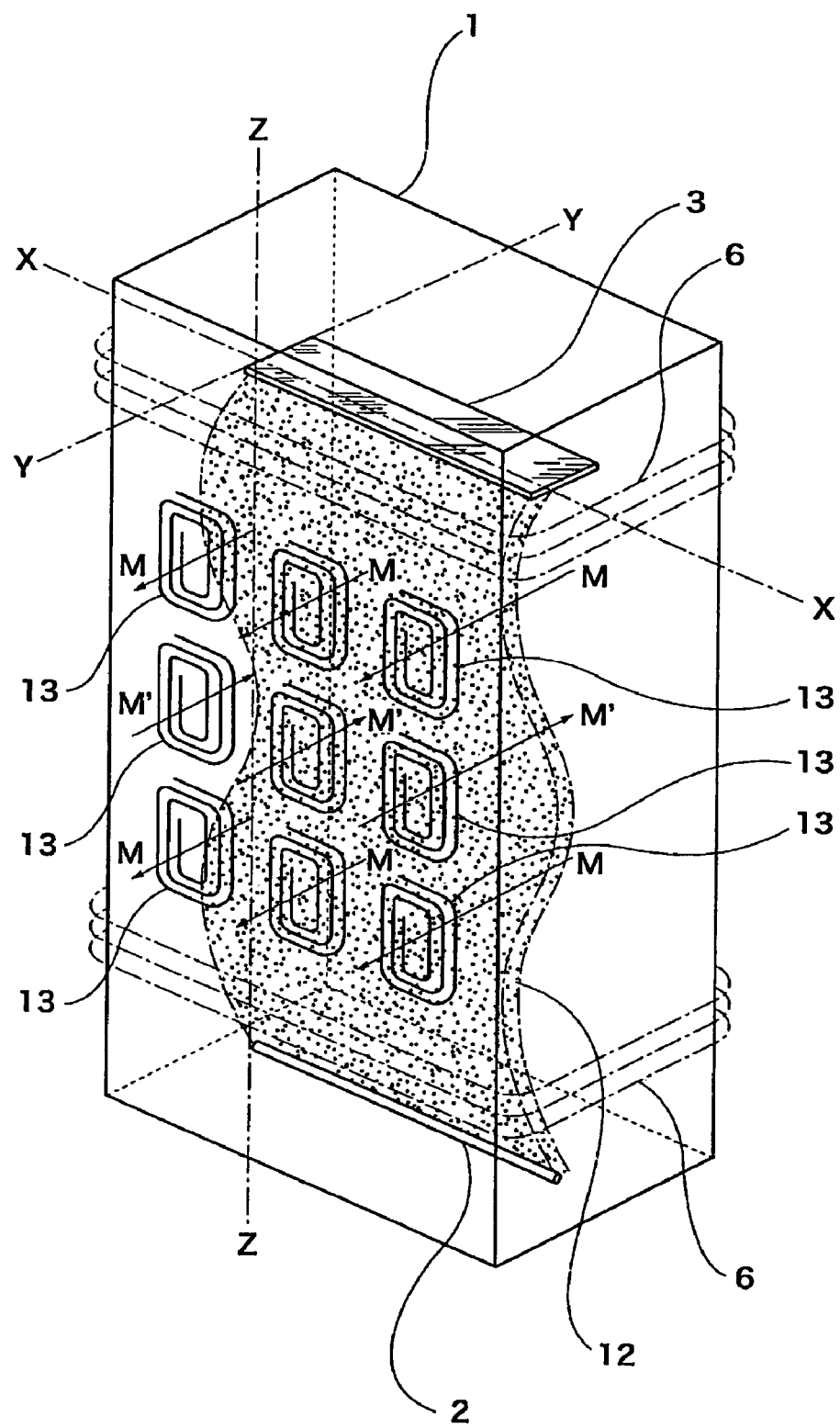
FIG. 5 A perspective view typically showing a curtain of light waved by means of deflecting coils in a further different embodiment.

FIGS. 3 to 5 shows respectively different embodiments of the present invention. These embodiments are improved such that the planar curtain-like light emission 7 is bent. The linear electrode of the instant example is composed of a flexible linear electrode 8 disposed substantially in the direction of X axis (see FIG. 3).

Electrode moving means 9 are arranged in the longitudinal direction the flexible linear electrode 8 so as to be connected to the flexible linear electrode 8 at several positions thereon. By the action of the electrode moving means 9, the flexible linear electrode 8 is bent toward the direction of Y axis into a waved form. When the flexible linear electrode 8 is bent into a waved form, electric discharge is caused in the direction of Z axis in the same waved form, allowing the curtain-like light emission to have pleats.

In order to compare with the pleats in the embodiment shown in FIG. 5 mentioned later, the form of the pleated aurora made in the instant embodiment shown in (FIG. 3) is elaborated. The pleated aurora in the present embodiment has a waved cross-sectional shape in any horizontal cross section and linear cross-sectional shape in any vertical cross section. The waved form can be likened to mountain ranges and valleys having sharp ridges up and down.

In FIG. 3, the pleats of the waved curtain-like light emission 10 can be moved arbitrarily by extending and contracting the electrode moving means 9. This means that the wave length and wave height (amplitude) of the wave form can be varied, the wave form can be traveled backward and forward, and the propagation speed of the wave can be controlled.

When the waved curtain-like light emission 10 is used for the purpose of exhibition, it is possible to effectively give sensational impression on the observers by moving the wave of pleats in accordance with the music played.

Although cylindrical members are shown as the electrode moving means 9 in FIG. 3, the electrode moving means of the present invention is not limited to such cylindrical members. As the electrode moving means, the present invention may employ any member or mechanism which can mechanically change the shape of the flexible linear electrode 8. For example, a stepping motor, linkage mechanism or cum mechanism may be employed.

FIG. 4 is a perspective view of the main part of another embodiment in which the waved electrode is moved by electro-magnetic operation. Along the X-Y plane, many electrodes are arranged in a matrix (grid-like pattern) to form XY array electrodes 11.

For example, when the electrodes represented by the black rectangular in FIG. 4 are connected to the power source (not shown), the XY array electrodes 11 operate substantially as a wave-form electrode. The XY array electrodes 11 can be made to form any shape of electrode by electrical operation.

FIG. 5 is a perspective view showing yet another embodiment. The instant embodiment is an improved embodiment of the embodiment shown in FIG. 1. The vacuumed chamber 1, electrode 2, electrode 3 and shaping coils 13 shown in FIG. 5 are similar to those shown in FIG. 1. (Although the power source 4, vacuuming means (Vac) and coloring gas introducing means (Gc) are not shown in FIG. 5, similar members or mean are employed in the instant embodiment.)

The instant embodiment shown in FIG. 5 is different from the embodiment shown in FIG. 1 in that deflecting coils 13 are employed. The deflecting coils 13 are arranged so as to produce magnetic fluxes (magnetic fields) M and M'.

The feature of the instant embodiment shown in FIG. 5 compared to the above-described other embodiments is (i) means to bend the planar light emission and (ii) the bent form of the planar light emission. The details are explained below.

(i) As a means to bend the planar light emission, the instant embodiment shown in FIG. 5 employs coils (13) producing magnetic fluxes in the direction of Y axis, whereas the embodiments shown in FIGS. 3 and 4 employ a planar electrode formed in a curved shape in the X-Y plane.

(ii) The bent form of the planar light emission in the instant embodiment shown in FIG. 5 is made of smooth and easy ridges, mountains and valleys compared to the bent form of the planar light emission in the embodiments shown in FIGS. 3 and 4, which are made of sharp ridges and hilly mountains and valleys.

In the instant embodiment shown in FIG. 5, the deflecting coils 14 are arranged in three vertical rows such that the waved curtain-like light emission 12 is bent to form two mountains and one valley. In the instant embodiment, various bent forms of the waved curtain-like light emission 12 can be achieved by arranging the disposition of the deflecting coils 13. Furthermore, it is possible to make aurora move like dancing in accordance with the music played, for example, by changing current of each deflecting coil 13.

The basic principle of the present invention is to generate a planar aurora curtain by producing magnetic field in the direction of Z axis such as shown in FIG. 1. On the other hand, it is also possible to change the thickness of the planar aurora curtain by regulating the magnetic field produced.

Furthermore, the linear electrode may be bent in the X-Y plane so as to form a pleated curtain of light such as shown in FIGS. 3 and 4. It is also possible to form pleats on the sides by producing magnetic fields in the direction of Y axis such as shown in FIG. 5.

In addition to the above-mentioned functions and effects, it is also possible to make aurora curtain flicker by regulating the voltage applied and to make aurora curtain colored by introducing coloring gases. Thus, the present invention enables to effectively achieve an excellent exhibition effect utilizing and arranging the above-described means and functions comprehensively.

What is claimed is:

1. An aurora generation device for generating aurora by causing electric discharge in a vacuumed chamber comprising:
    in orthogonal coordinates consisting of X, Y and Z axes;
    two electrodes each connected to a power source and disposed to face each other in the direction of Z axis, at least one of said electrodes disposed in an X-Y plane and extending linearly in the direction of X axis, said one of said electrodes made of flexible linear member capable of being curved;
    electric driving means to move said linear member in the direction of Y axis; and
    coils producing magnetic flux between said two electrodes in the direction of Z axis, wherein
    said electric driving means moves said linear member in the direction of Y axis to form a curved shape, and wherein
    electric discharge is caused between said two electrodes and said coils produce magnetic flux between said two electrodes, thereby generating light emission in the form of a curved plane bent toward the direction of Y axis.

2. The aurora generation device as set forth in claim 1 further comprising means to regulate current of said coils producing magnetic flux in the direction of Z axis.

3. The aurora generation device as set forth in claim 1 further comprising means to regulate electric discharge caused between said two electrodes/between said electrode and said selected electrodes, said means causing electric discharge by applying pulsed voltage having such a cycle that the light emission appears flickering to an observer.

4. The aurora generation device as set forth in claim 1 further comprising vacuuming means to decrease the pressure in said vacuumed chamber by vacuuming and injection means to inject gases into said vacuumed chamber.

5. An aurora generation device for generating aurora by causing electric discharge in a vacuumed chamber comprising:
    in orthogonal coordinates consisting of X, Y and Z axes;
    an electrode disposed at an end in the direction of Z axis;
    an assembled electrode consisting of electrodes arranged in a matrix on an X-Y plane disposed to face said electrode in the direction of Z axis; and
    coils producing magnetic flux between said electrode and said assembled electrode in the direction of Z axis, wherein
    electric discharge is caused between said electrode and selected electrodes of said assembled electrode, said selected electrodes collectively forming a curved shape, and wherein
    said coils produce magnetic flux between said electrode and said selected electrodes,
    thereby generating light emission in the form of a curved plane bent toward the direction of Y axis.

6. An aurora generation method for generating aurora by causing electric discharge in a vacuumed chamber using a device comprising:
    in orthogonal coordinates consisting of X, Y and Z axes;
    two electrodes each connected to a power source and disposed to face each other in the direction of Z axis, at least one of said electrodes disposed in an X-Y plane and extending linearly in the direction of X axis, said one of said electrodes made of flexible linear member capable of being curved;
    electric driving means to move said linear member in the direction of Y axis;
    coils producing magnetic flux between said two electrodes in the direction of Z axis; and
    deflecting coils producing magnetic flux substantially in the direction of Y axis, whereby
    said electric driving means moves said linear member in the direction of Y axis to form a curved shape, electric discharge is caused between said two electrodes and said coils produce magnetic flux between said two electrodes, and light emission is generated in the form of a curved plane bent toward the direction of Y axis.

7. An aurora generation method for generating aurora by causing electric discharge in a vacuumed chamber using a device comprising:
    in orthogonal coordinates consisting of X, Y and Z axes;
    an electrode disposed at an end in the direction of Z axis;
    an assembled electrode consisting of electrodes arranged in a matrix on an X-Y plane disposed to face said electrode in the direction of Z axis; and
    coils producing magnetic flux between said electrode and said assembled electrode in the direction of Z axis, whereby
    electric discharge is caused between said electrode and selected electrodes of said assembled electrode, said selected electrodes collectively forming a curved shape, said coils produce magnetic flux between said electrode and said selected electrodes, and light emission is generated in the form of a curved plane bent toward the direction of Y axis.

* * * * *